Sept. 29, 1953      K. F. PITTMAN      2,654,020
INDIRECT INSTRUMENT ILLUMINATION
Filed Dec. 10, 1949
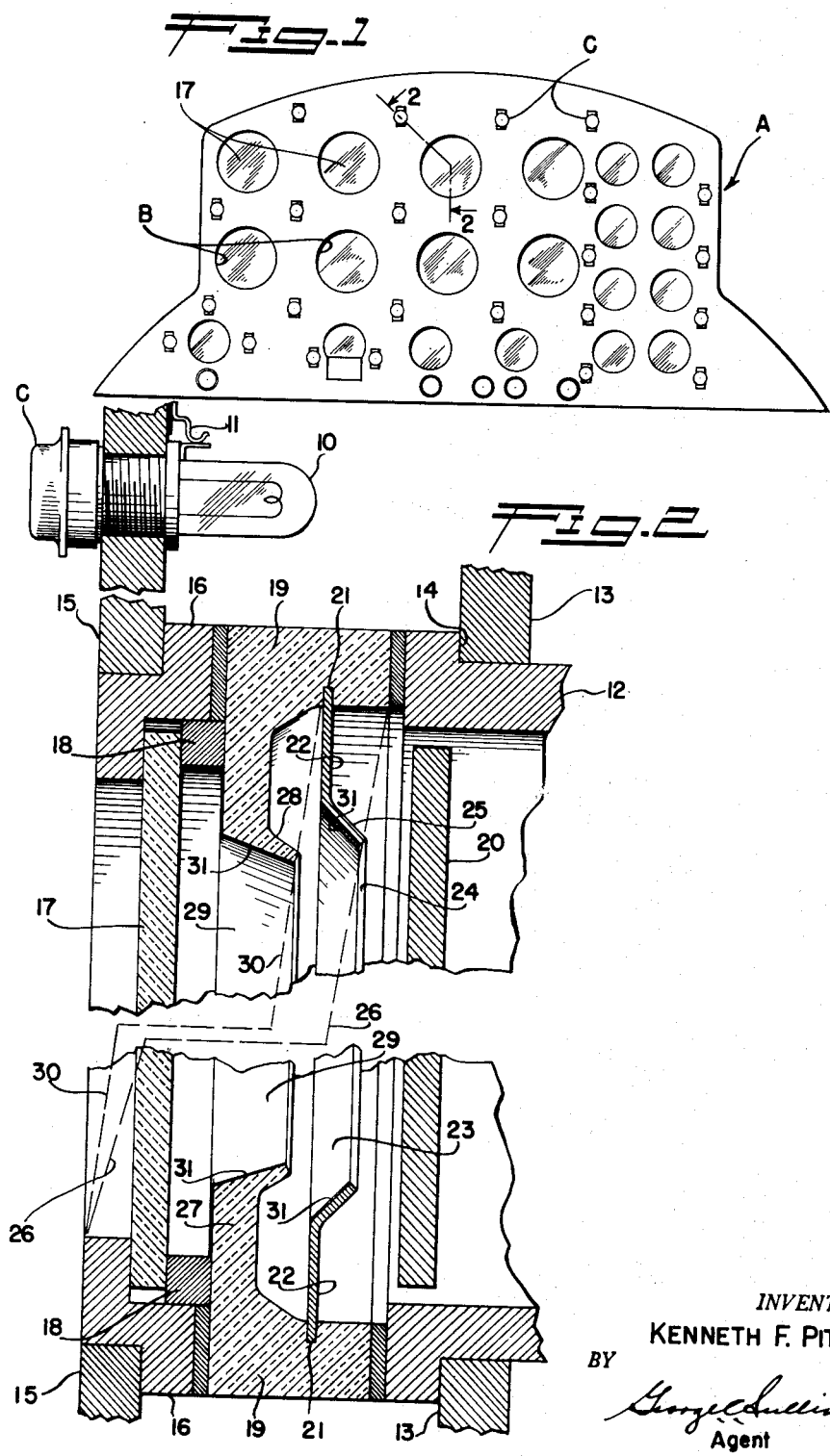
INVENTOR.
KENNETH F. PITTMAN
BY
George Sullivan
Agent Patented Sept. 29, 1953

2,654,020

UNITED STATES PATENT OFFICE 2,654,020

INDIRECT INSTRUMENT ILLUMINATION

Kenneth F. Pittman, North Hollywood, Calif., assignor to Lockheed Aircraft Corporation, Burbank, Calif.

Application December 10, 1949, Serial No. 132,316

3 Claims. (Cl. 240—2.1)

This invention relates to an improved instrument lighting system utilizing indirect red light, wherein light conductive plastic material is masked to transmit and direct the light onto the instrument dial; the masking effect being designed to both prevent direct vision of the light emitting areas of the plastic material and to eliminate stray reflections that otherwise might be reflected from surrounding surfaces such as the windshield or canopy of an airplane, for example.

Both the military and naval services have conducted extensive experimentation directed to obtaining satisfactory illumination of individual instrument dials in the elaborate and extensive instrument panels necessary in modern high performance airplanes. White lighting has long since become obsolete because a pilot requires as much as a half hour to recover his maximum night vision after a glance at an instrument panel so illuminated. Direct lighting of all types has also been ruled out because of the many uncontrollable reflections from surrounding objects. Indirect red and ultra-violet ("black") lighting are currently in vogue but even with such indirect lighting it has heretofore been found impossible to eliminate all stray light beams which produce extraneous reflections from the windshield and transparent canopy of an airplane, for example. In comparing indirect red and ultra-violet or black lighting it has been found that while the black light is nominally invisible and relies on fluorescent lettering on the instrument dial for visibility, such lighting also affects the pilot's eyes, apparently developing a fluorescent effect in his eyeballs which results in hazy vision. Red lighting, on the other hand, has the least effect on the pilot's subsequent night vision.

It is accordingly an object of this invention to provide an improved indirect red illumination of instrument dials wherein a diffused illumination is concentrated on the instrument dial, and the light transmitting medium is masked to prevent direct or reflected rays therefrom from issuing through the instrument cover glass to be visible or reflected to the pilot's eyes, as from the highly reflective surfaces of the windshield or cockpit canopy.

It is also an important object of this invention to provide a light transmitting and masking system of the type described that can be incorporated in and tailored to individual instrument cases of diverse type and manufacture. The various types of instruments necessarily combined on an airplane instrument panel are the products of several manufacturers and vary in size and shape, particularly in the details of the cover glass mounting and spacing relative to the instrument dial. The light transmitting and masking arrangement of this invention is designed to be readily installed in existing instrument cases and to be tailored to each installation in order to cut off light rays that might otherwise emerge through the cover glass.

It is a further object of this invention to provide a light transmitting medium in the form of a ring that can be installed in individual instrument cases without alteration thereof, the light emitting areas of such medium being limited to the projection of light onto the dial at angles preventing the emergence of direct or reflected light rays from the instrument case.

Other objects and features of the invention will be readily understood from the following detailed description of a typical preferred form of the invention wherein reference will be made to the accompanying drawings in which:

Figure 1 is a front or pilot's view of an aircraft instrument panel embodying the instrument lighting features of this invention, and Figure 2 is a greatly enlarged fragmentary detail section taken on the line 2—2 of Figure 1 showing the lighting arrangement for one instrument.

As shown in Figure 1, an airplane pilot's instrument panel is generally indicated by the reference letter A, such a panel supporting a variety of flight and engine instruments in suitable spaced apertures B, with small instrument light knobs C so disposed relative to the various apertures that failure of any one light will not completely black out adjacent instrument dials. As shown in Figure 2, the exposed knobs C each carry small red electric bulbs 10 projecting through the panel and individually energized by contacts 11.

While the panel A may form a single unit with the several instrument cases 12 either front or back mounted in the apertures B therefor, the panel as detailed in Figure 2 is preferably formed of a relatively rigid rear or main panel 13, in which the instrument cases 12 are front mounted at flanges 14. A readily removable light front panel 15 is then mounted over bezel rings 16 of the instruments in spaced relationship to the main panel 13. Thus the front panel 15 corresponds to the visible panel A in Figure 1 and the light knobs C extend through the front panel with their associated electric bulbs 10 projecting on the back of the panel 15, in the space between the two panels. Such a lighting arrangement is commonly referred to as indirect lighting as the front panel 15 prevents any stray light reaching the cockpit except through the instrument apertures B.

The bezel ring 16 of the instrument case 12 supports a cover glass 17 and is spaced from the case 12 by gaskets 18 and a ring 19 of light transmitting plastic material such as methyl methacrylate, more commonly known as "Lucite" or "Plexiglas." The red light from the adjacent bulbs 10 enters the exposed outer surface of the ring 19 and is diffused therethrough, emerging internally over selected areas polished for light emission and distribution to the instrument dial 20.

Embedded internally of the ring 19, approximately midway between the sides of the ring, is a masking ring 21 of opaque material preferably provided or coated on its dial side with a reflective surface such as white paint 22, and provided on its outer or opposite side with a non-reflective surface 23 such as a coating of matt black paint or lacquer. The masking ring has a central opening 24 sufficiently large to render the dial markings visible at the pilot's normal angle of vision. The margin 25 of this aperture is bent or flanged inwardly or towards the dial sufficiently to cut off any direct rays from the inner side of the ring 19 from escaping past the edge of the bezel ring 16, as indicated by the dash line 26.

Outwardly, or to the left of the masking ring 21, the light transmitting ring 19 is formed with a ring portion 27 extending radially inward and terminating with a flange 28, similar to the masking ring flange 25, which flange 28 also defines a visual aperture 29 and extends to the right or inwardly sufficiently to cut off any direct rays of light emitted by the portion of the ring 19 to the left of the masking ring, as indicated by the dash line 30. The surface of the ring portion 27 and the flange 28 visible through the cover glass 17 is coated with an opaque paint or other coating 31 to prevent emission of light from said surfaces.

The instrument cases of various manufacturers vary both in size and in the projection of the bezel ring 16 relative to the mounting flange 14. In order to apply my invention to existing instruments it is accordingly necessary to tailer the rings 19 and 21 to the individual instruments. Also, the individual locations of the instruments in the panel A might well call for a variation in diameter in the central apertures in these rings, to enable the pilot to have full vision of each instrument dial from the angle of sight determined by the side and vertical displacement of the line of sight from that normal to the dial in a centrally located instrument. Such displacements involve proportionately enlarged central apertures in the rings 19 and 21, which, in turn, call for deeper flanges 25 and 28 to prevent escape of light rays from the internal light emitting surfaces of the ring 19. Thus the inturned flanges 25 and/or 28 are critical in order to prevent reflections from extraneous objects in or surrounding the cockpit, such for example as the windshield and canopy surfaces which become good mirrors for stray interior lighting under night flying conditions.

It will thus be seen that I have invented a new and improved instrument lighting system whereby stray light from individual instruments is cut off, and reflections from extraneous objects thus prevented.

Having described only typical forms of the invention I do not wish to be limited to the specific details herein set forth, but wish to reserve to myself any variations or modifications that may appear to those skilled in the art and fall within the scope of the following claims.

I claim:

1. In an indirect instrument lighting system of the class described, the combination with an instrument comprising a case, a dial therein, and a cover for said case, of a ring of light transmitting material disposed between the cover and the case of said instrument with its periphery exposed to receive exterior illumination, said ring being polished on the surfaces exposed to the dial and opaque on the surfaces visible through said cover, said ring having a radial inward extension on its cover side terminating in a re-entrant flange extending toward the dial side of the ring to partially enclose a radial surface of the ring directing emitted light towards the dial, and centrally apertured masking means carried by said ring interiorly thereof and so arranged that the edges of the aperture therein expose the dial while preventing the passage of light rays from the polished surfaces of said ring from emerging through the cover of said instrument.

2. In an indirect instrument lighting system of the class described, the combination with an instrument comprising a case, a dial therein, and a cover for said case, of a ring of light transmitting material disposed between the cover and the case of said instrument with its periphery exposed therebetween, said ring being polished on the surfaces exposed to the dial and opaque on the surfaces visible through said cover, said ring having a radial inward extension on its cover side terminating in a re-entrant flange extending toward the dial side of the ring to partially enclose a radial surface of the ring directing emitted light towards the dial.

3. A light transmitting ring adapted to be interposed between the dial and the cover of an instrument, comprising a ring of light transmitting material having its periphery exposed to a source of light and its inner surface polished to emit light rays toward the dial, the cover side of said ring having an inwardly extending radial wall with a central aperture surrounded with a flange extending in the direction of the instrument dial, the visible portions of said radial wall and flange being rendered opaque.

KENNETH F. PITTMAN.

References Cited in the file of this patent

UNITED STATES PATENTS

| Number | Name | Date |
|---|---|---|
| 2,102,384 | Scantlebury | Dec. 14, 1937 |
| 2,140,972 | Rylsky | Dec. 20, 1938 |
| 2,259,910 | Rylsky | Oct. 21, 1941 |
| 2,537,971 | Dames | Jan. 16, 1951 |

FOREIGN PATENTS

| Number | Country | Date |
|---|---|---|
| 512,295 | England | Aug. 31, 1939 |